Jan. 26, 1937.  B. B. SMITH  2,068,774
AIRCRAFT
Filed May 20, 1935  2 Sheets-Sheet 1

Inventor
Beauford B. Smith
By
James D. Givnan
Attorney

Jan. 26, 1937.  B. B. SMITH  2,068,774
AIRCRAFT
Filed May 20, 1935  2 Sheets-Sheet 2
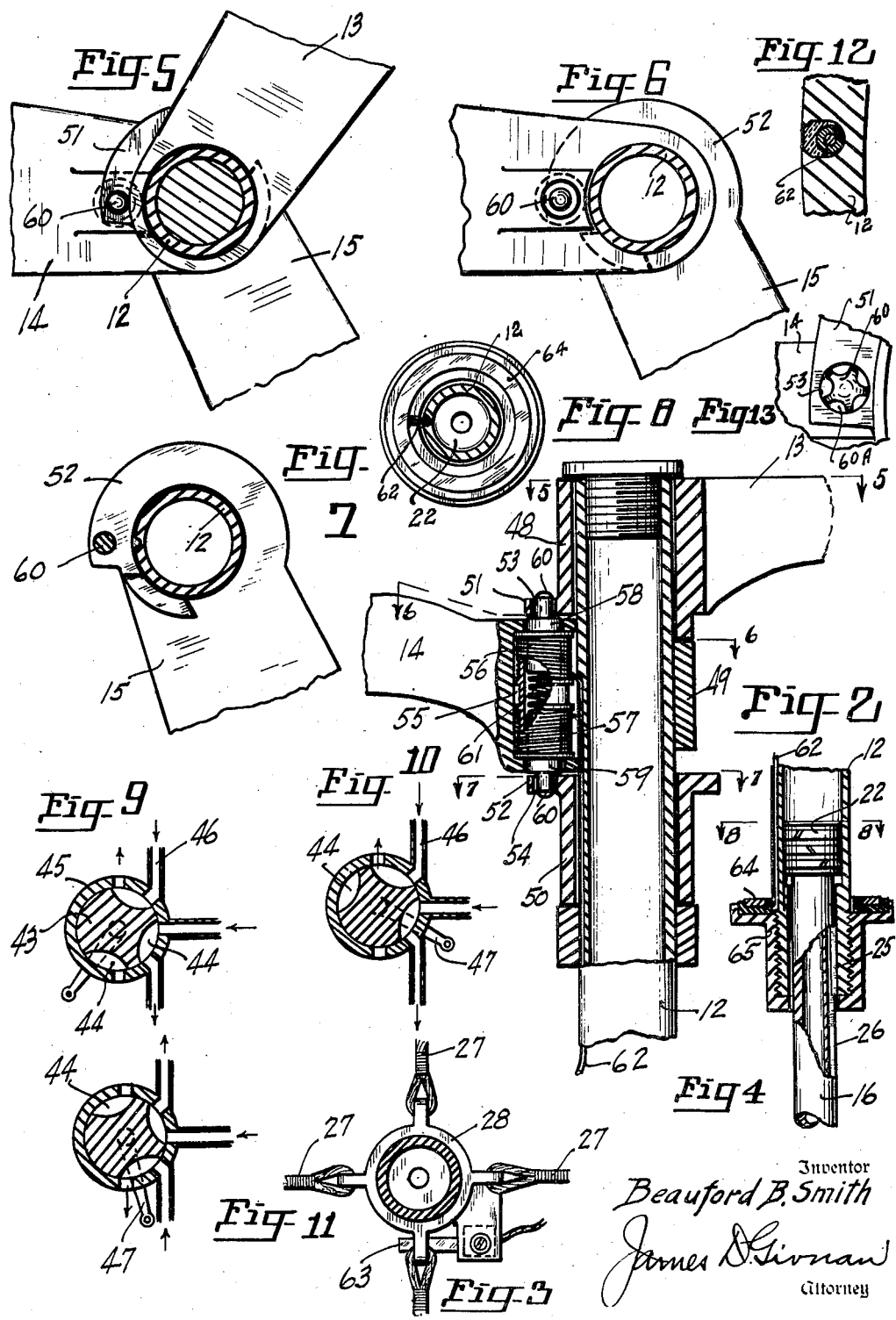
Inventor
Beauford B. Smith
James D. Givnan
Attorney Patented Jan. 26, 1937

2,068,774

UNITED STATES PATENT OFFICE 2,068,774

AIRCRAFT

Beauford B. Smith, Silverton, Oreg.

Application May 20, 1935, Serial No. 22,309

1 Claim. (Cl. 244—17)

This invention relates to improvements in aircraft and more especially to the type of aircraft shown and described in my United States Patent, Number 2,008,843, dated July 23, 1935 and entitled Aircraft.

The invention described in the said co-pending application is directed to a collapsible autogyro in operative engagement with an airplane. The present invention relates to improvements in means for automatically advancing the said autogyro from a collapsed position of repose within the fuselage of the aircraft to the exterior thereof into an operative position. The present application also covers new and improved automatic means for interconnecting the blades or elements of the gyro into operative engagement and proper working relation with each other and with the supporting and driving means therefor. The fact that the said foregoing improvements are particularly adapted to the type of aircraft and gyro shown and described in my said co-pending application does not, however, prescribe the limits of utility of the said invention, since obviously, they may be readily adapted to any type of collapsible and retractable gyro.

The principal object of the present invention is to provide means for automatically advancing the gyro from a collapsed position within the fuselage to a point exterior thereof by pneumatic means which is designed and arranged to advance said gyro by pressure applied evenly at both of its ends so that the advancing operation of the gyro will be positive in its action, and so that the gyro while in the process of being collapsed, will not tend to bind against the main supporting shaft under the influence of air pressure caused by the wash of the propeller of the aircraft.

A further object of the invention is the provision of automatic electric means for operatively uniting each of the blades of the gyro with each other through a remote control.

Still another object of the invention is the provision of manually controlled valves synchronized in their operation to cause simultaneous release of pneumatic pressure to retract the folded gyro back to the interior of the fuselage into a position of repose.

These and other objects will appear as my invention is more fully hereinafter described in the following specification, illustrated in the accompanying drawings, and finally pointed out in the appended claim.

In the drawings—

Figure 2 is an enlarged, fragmentary, sectional side view of the upper end of the gyro drive shaft showing means for electrically interconnecting and disconnecting said blades.

Figure 3 is an enlarged sectional plan view taken on the line 3—3 of Figure 1.

Figure 4 is a fragmentary, sectional, detail view of a rotatable shaft within a movable housing.

Figure 1:
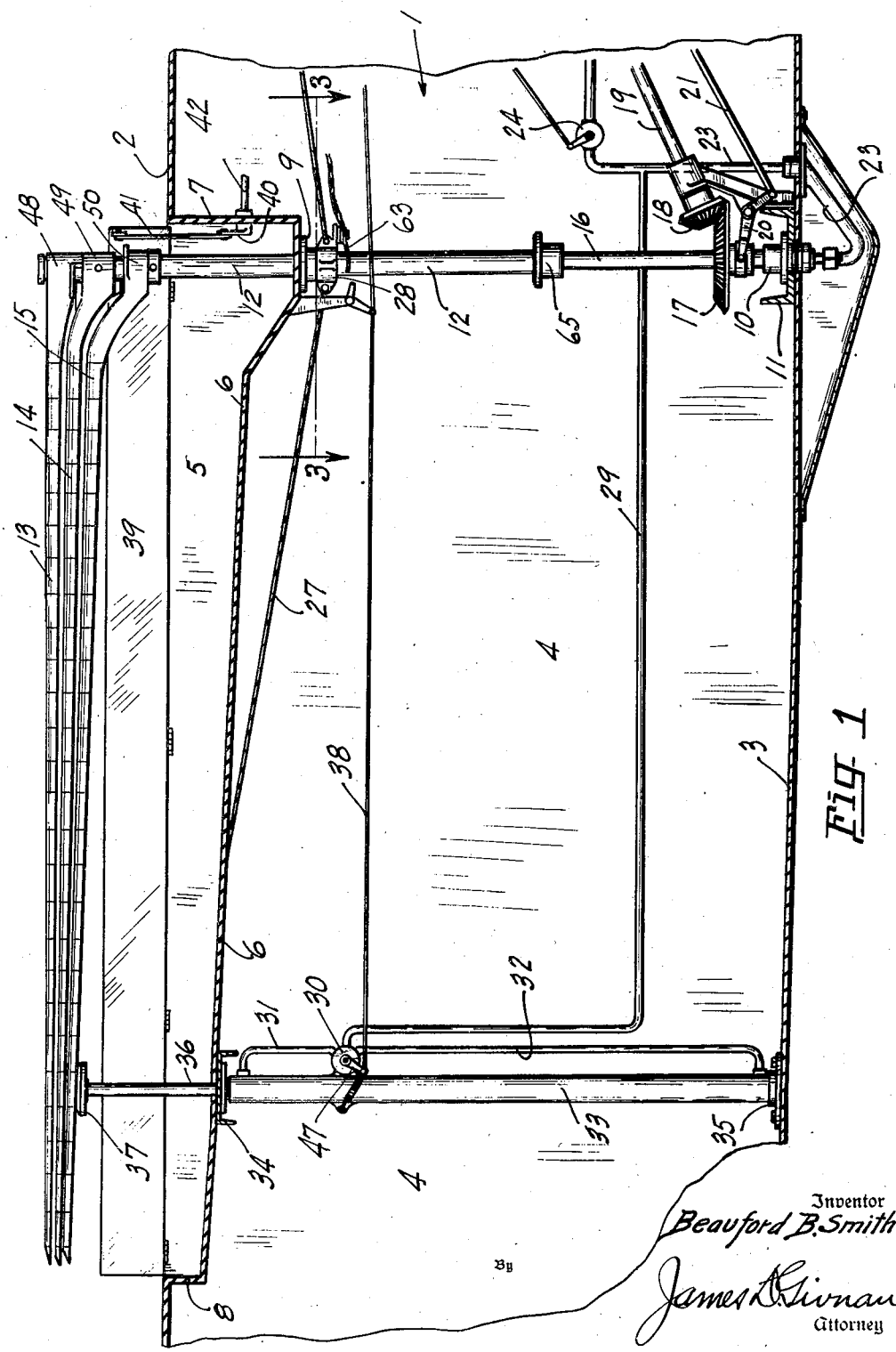
Figure 1 is a fragmentary sectional side elevation of an airplane fuselage provided with a collapsible and retractable gyro, and showing my new and improved raising and lowering means in operative engagement with said gyro.

Figures 5, 6, and 7 are sectional plan views taken on the lines 5—5, 6—6, and 7—7 of Figure 2.

Figure 8 is a sectional plan view taken on the line 8—8 of Figure 4.

Figures 9, 10, and 11 are sectional side elevations of a three-way valve.

Figure 12 is an enlarged fragmentary, sectional view showing the method of imbedding one of the wires used in my electrical circuit in insulating material in one of the members with which it is associated.

Figure 13 is an enlarged fragmentary detail plan view of a locking stud formed with longitudinal flutes to reduce friction during its advancement into an aperture.

Referring now more particularly to the drawings:

Reference numeral 1 indicates generally, the fuselage of an aircraft having top and bottom walls 2 and 3, and the usual side walls 4. Within the top wall of the fuselage is formed a cavity, generally indicated at 5, and consisting of a floor 6, and end walls 7 and 8. These elements are of sufficient strength and rigidity to compensate for the structural elements removed in forming the cavity. To the bottom side of the floor 6, I securely mount a flanged bushing or bearing 9, and in vertical alignment with this bearing I mount a companion bearing 10 to the bottom wall of the fuselage 1 which may be reinforced by any suitable structural element, such for instance, as a channel member 11 arranged transversely of the fuselage to support the mechanism to be hereinafter described. Rotatably and slidably mounted in the bearing 9, is a hollow sleeve 12, to which, at its uppermost end, are rotatably and lockably mounted a plurality of air foils 13, 14, and 15, of the type used in present day autogyro aircraft.

Rotatably mounted within the bearing 10 is a hollow vertical drive shaft 16 provided near one of its ends with a driven bevel gear 17 and a companion driving pinion gear 18 which receives its power from a drive shaft 19 interconnected with any approved source of power, such for instance, as the engine of the aircraft. Any suitable form of clutching mechanism, such for instance, as the bell crank 20 and operating arm 21, may be used for advancing or retarding the driven gear 17 into and out of operative engagement with the pinion gear 18 so that the shaft 16 may be selectively driven or rotated by the pilot of the aircraft. The uppermost end of the hollow shaft 16 is provided with a piston 22 which is slidably embraced by the sleeve 12. The lowermost end of the shaft 16 is in open communication with an air line 23 which is controlled by a valve 24 so that as the valve is opened and air pressure is applied to the interior of the shaft 16, said pressure will move the sleeve 12 upwardly and project it together with the air foils 13, 14 and 15 beyond the uppermost wall of the fuselage. The sleeve 12 is slidably engaged with the hollow shaft 16 by means of a key 25 and a key-way 26 so that as power is applied to the gear 17 at the same time air pressure is applied to the interior of the shaft 16 and sleeve 12, as aforesaid, the sleeve 12 will be moved upwardly and rotated at the same time. The rotation of the shaft, however, should be timed by the pilot or operator in such a way, of course, that the sleeve 12 and air foils do not rotate until they have passed upwardly beyond the uppermost edge of the fuselage. The sleeve 12 in addition to passing through the floor 6 of the cavity is further reinforced or stabilized by guy-wires 27 which extend from a collar 28 to any suitable point of anchorage upon the structural elements of the fuselage.

A branch air line 29 is in open communication with the air line 23 and extends therefrom to another valve 30 from which extend conduits 31 and 32. The conduit 31 upon proper manipulation of the valve 30 directs pressure to the uppermost end of a hollow cylinder 33 which is securely mounted within the fuselage by any suitable means, such for instance, as the channel member 34 and the bracket 35. Within this cylinder is slidably mounted a shaft 36 formed with a head 37 at its uppermost end and any suitable form of piston at its lowermost end for a sliding fit within said cylinder 33. The other of said conduits 32 extends from the valve 30 to the lowermost end of the cylinder 33 so that upon further manipulation of the valve 30, air pressure may be directed to the interior of the cylinder at its lowermost end or below said piston. By this arrangement the shaft 36 may be selectively forced upwardly or downwardly to assist either in the projecting of the air foils or in the retracting operation of the same. The valve 30 is provided with any suitable form of control 38 which may be operated simultaneously with the control for the valve 24 so that both ends of the air foils will be projected or retracted evenly and simultaneously.

Any suitable form of cover plate 39 may be mounted adjacent the cavity 5 for opening and closing the same by any suitable form of operating mechanism, such for instance, as the crank arm 40, link 41 and shaft 42.

The valve is best illustrated in Figures 9, 10, and 11, wherein the valve is shown as having a valve body 43 formed with relieved portions 44 and rotably mounted within a housing 45 through which a plurality of inlets and outlets 46 are provided. The arrows shown in these figures illustrate the selectivity of the valve in directing pressure passed therethrough in various directions upon manipulation of a handle 47 to control, as aforesaid, the upward and downward movement of the shaft 36 within the cylinder 33 by directing pressure to either end thereof.

Each of the air foils 13, 14, and 15 may be regarded as one blade of a propeller provided with hubs 48, 49, and 50 by means of which the blades are rotatably mounted upon the sleeve 12. The hub 48 of the top blade 13, is formed with a flange 51 at its lower end. The hub 50 of the air foil 15 is formed with a flange 52 at its upper end. Both of said flanges are provided with apertures 53 and 54. The hub 49 of the central air foil 14 is enlarged to form a cavity 55 within which are mounted a pair of solenoids 56 and 57. Each solenoid is provided with a core 58 and 59. The outermost end of each of said cores is reduced into outwardly extending studs 60, which are adapted to normally engage within the apertures 53 in said hub flanges when the blades are in their proper working relation to each other. Each stud is longitudinally fluted as at 60A to facilitate its entrance into the apertures and to reduce friction to a minimum. A coil spring 61 is interposed between said solenoid cores and normally urges the cores into their extended positions. In other words, the ends of the studs 60 remain in wiping contact with the flanges 51 and 52 until the said apertures 53 and 54 come into alignment with each other and in position to receive the studs. When the apertures are thus aligned, the spring 61 thrusts the studs outwardly into the apertures to lock the blades as aforesaid in their proper working relation. Both solenoids are supplied with electrical energy by means of an electric circuit 62 which extends from the solenoids to any suitable source of supply, such for instance, as a storage battery or the like, thence to a switch, and finally to a ground connection 63. The ends of the windings of the solenoid opposite to those to which the circuit 62 is connected, are grounded by any approved means to the sleeve 12 so that as the switch (not shown) is closed, electric current will flow through the circuit 62 through the solenoids into the ground connections, thence back to the source of supply. To prevent twisting of the circuit 62, I interpose a collector ring 64 within said circuit and mount the same upon the upper end of a flanged coupling 65 upon which bears the lowermost end of the sleeve 12. The coupling is mounted to the uppermost end of the shaft 16.

While I have shown a particular form of embodiment of my invention, I am aware that many minor changes therein will readily suggest themselves to others skilled in the art without departing from the spirit and scope of my invention. Having thus described the invention, what I claim as new and desire to protect by Letters Patent, is:—

In an airplane having a fuselage, the combination of an extensible and rotatable shaft adapted to be projected outwardly from said fuselage, a plurality of air foils rotatably mounted upon one end of said shaft, and means for locking said air foils in proper working relation with each other and with the shaft when the shaft is projected, said means consisting of a pair of solenoids carried by one of said air foils and adapted to normally interlock said blades with respect to each other, and said solenoids when energized adapted to disconnect said air foils from said working relation and to permit collapsing of said air foils into a stacked position.

BEAUFORD B. SMITH.